United States Patent [19]

Miller

[11] Patent Number: 5,261,333
[45] Date of Patent: Nov. 16, 1993

[54] AUTOMATED BALLAST DOOR MECHANISM

[75] Inventor: Daniel L. Miller, Bloomdale, Ohio
[73] Assignee: Difco, Inc., Findlay, Ohio
[21] Appl. No.: 887,358
[22] Filed: May 21, 1992
[51] Int. Cl.⁵ .............................................. B65D 47/00
[52] U.S. Cl. .................................. 105/287; 105/240; 105/290; 105/286; 105/308.1; 105/309; 105/284
[58] Field of Search ............... 105/250, 240, 252, 251, 105/280, 284, 286, 287, 289, 290, 308.1, 308.2, 309, 304, 306; 298/27, 29, 31, 33, 34, 35 R, 36, 37, 35 M

[56] References Cited

U.S. PATENT DOCUMENTS

| | | | |
|---|---|---|---|
| 980,870 | 1/1911 | Hoke | 298/35 R |
| 2,663,231 | 12/1953 | Wood | 298/35 M |
| 3,145,057 | 8/1964 | Taggart | 298/35 M |
| 3,173,381 | 3/1965 | Charles et al. | 105/240 |
| 3,298,745 | 1/1967 | Czapiewski | 105/240 |
| 3,759,573 | 9/1973 | Rosenbaum | 298/29 |
| 4,452,149 | 6/1984 | LeMarbe | 105/250 |
| 4,454,822 | 6/1984 | Fischer | 105/250 |
| 4,844,292 | 7/1989 | Lonardi et al. | 298/35 M |

FOREIGN PATENT DOCUMENTS 0373293 12/1921 Fed. Rep. of Germany ...... 105/251

*Primary Examiner*—Mark T. Le
*Attorney, Agent, or Firm*—Marshall & Melhorn

[57] ABSTRACT

A discharge arrangement for dispensing the contents of a hopper. The discharge arrangement is particularly suitable for use as an automated ballast door operating mechanism on a railroad hopper car transporting ballast for use in roadbed restoration. The hopper includes at least one discharge opening for discharge of the contents of the hopper. Discharge arrangements are installed over each hopper discharge opening to provide regulation of the discharge of the contents. Each arrangement includes a pair of doors. Locking means are provided by which both or either of the pair of doors may be locked closed. The positioning of the doors is automated in that a fluid motor is connected between the doors. The fluid motor may be actuated to partially or fully open a selected door to regulate discharge.

22 Claims, 5 Drawing Sheets

AUTOMATED BALLAST DOOR MECHANISM

BACKGROUND OF THE INVENTION

1. Field of the Invention

This invention relates to a discharge arrangement for discharging material from storage, and more particularly to an automated ballast door mechanism allowing selective discharge of stone ballast from railroad hopper cars onto the roadbed of a railway.

2. Prior Art

Railroad hopper cars are used to transport many types of materials, including, but not limited to, coal, grain, crushed stone, and other loose bulk materials. It is generally customary to fully discharge material from hopper cars into an opening between the railroad tracks by a continuous flow when the doors have been opened.

The loading and unloading of sections of track caused by the passage of wheels of railroad cars traveling on the track creates a "pumping" action in which the ties supporting the rails flex. This "pumping" action tends to push the ballast stone out from under the ties. This phenomenon is especially pronounced at the end of the ties, with the result that more ballast is pushed out from under the ties outside the rails than inside the rails. As a result, ballast must be replaced outside the rails more frequently and to a greater extent than beween the rails.

Therefore, in the discharge of ballast onto the roadbed of a railway in the course of re-ballasting the Therefore, in the discharge of ballast onto the roadbed of a railway in the course of re-ballasting the roadbed, it is important to be able to direct the flow of ballast to the various sections of roadbed, including both the area between the rails, and the area outside the rails. It is also important to limit the flow according to the amount of ballast desired as the car moves along the track.

The use of a discharge arrangement to control the discharge of ballast through a bottom outlet in a railroad hopper car is well known. Known discharge arrangements or gate assemblies are disclosed, for example, in U.S. Pat. Nos. 3,122,106, 3,654,872, 3,822,650, 4,009,664, and 4,452,149.

The arrangement in the ('106) patent is mounted transversely, and includes a hydraulically actuated linkage assembly which may be operated to discharge ballast over the width of the arrangement, both inside and outside the rails.

The discharge arrangement of the ('872) patent is attached to sloped extensions of the ballast car bottom and includes a manually rotatable discharge control member. The member is pivotally suspended above a discharge opening, blocking it. Rotation of the member allows ballast to fall from an opening and be diverted to a selected side of a rail in a distribution channel defined by a side wall and the control member.

The discharge arrangement of the ('650) patent is similar to that disclosed in the ('872) patent, except that the discharge control member is formed with a concave discharge plate to define, in part, its distribution channel In the ('664) patent the discharge arrangement further includes a locking device to hold the discharge control member in a fixed location.

The ('149) patent discloses a set of bottom outlet discharge arrangements, each arrangement having an inner and an outer opening selectively blocked by an arcuate shaped door pivotally mounted within each opening. The inner and outer doors may be selectively upwardly opened to discharge ballast on a respective side of a rail. Each door is connected by linkage to an inner and outer door shaft carried concentrically by the unit. Selective rotation of either shaft moves the respective door to cover or uncover the unit opening to regulate ballast discharge.

These prior art units are satisfactory in many respects, but they have proven inadequate in that no single prior art unit provides a discharge arrangement incorporating all the following desirable features: a simple design utilizing a minimum of moving parts; a simple yet secure locking mechanism to prevent accidental discharge of the contents of the hopper; and an automated (powered) operating mechanism which may be remotely operated for safety and convenience, and capable of regulating the discharge of the contents of the hopper. Thus, those skilled in the art have continued to search for solutions to these long standing problems.

SUMMARY OF THE INVENTION

A discharge arrangement is provided for discharging a load from a hopper structure, which is especially suitable for use as an automated ballast door mechanism on a railroad hopper car transporting and discharging ballast used in maintaining a railway bed. The bottom of the hopper structure is provided with at least one discharge opening.

Associated with each discharge opening is a discharge arrangement comprising a frame member having end walls and side walls, forming an inlet and an outlet portion of the discharge arrangement. The inlet portion is proximate the discharge opening of the hopper structure.

A shielding device extends between the end walls and divides the outlet portion of the discharge arrangement into a pair of outlets.

Associated with each pair of outlets is a pair of outlet doors pivotally mounted to the end walls of the frame member. Each pair of associated outlet doors is provided with a locking mechanism by which one or both of the outlet doors may be selectively prevented from opening.

A door restraining mechanism comprised of a linkage arrangement is connected to each of the outlet doors, to limit the travel of the doors in the open direction. Each pair of associated outlet doors is directly interconnected by a suitable operating mechanism which may be operated to cause an unlocked door to open.

This novel discharge arrangement has several advantages over discharge arrangements heretofore known. First, the use of a hydraulic cylinder and piston shaft arranged to directly operate the associated pair of inner and outer doors, without intervening linkage arms, provides a simple design minimizing moving parts and associated costs.

Second, the use of hydraulics for operating the door also allows operation of the discharge arrangement at a position out of the immediate vicinity of the door, and the discharging ballast, thereby increasing operator safety.

Third, a simple yet secure locking mechanism is provided to prevent accidental discharge of ballast during transport, which would be hazardous to nearby life and property, and could lead to derailment.

Fourth, ballast may be selectively discharged on either side of a rail, depending on the needs of the track crew, without depositing it on the rail. The amount of labor needed to distribute the ballast by the track crew is thereby minimized.

Lastly, the use of hydraulics allows the doors to be easily opened and closed, thereby allowing a more controlled ballast discharge. The motive force required for automated opening and closing of the doors is minimized through the positioning of each door at an offset angle to the gravitational force of the ballast.

Therefore, it is an object of this invention to provide an arrangement by which a load carried by a vehicle provided with a hopper structure may be selectively discharged from either side of the arrangement.

It is a further object of this invention to provide a remotely controlled operating mechanism which governs the extent to which the discharge doors are opened, thereby allowing safe and convenient control over the rate of discharge of the load.

Yet another object of this invention is to include an automated hydraulic power unit in the door-control mechanism, in order that the doors may be fully or partially closed at will, despite the resistance offered by the weight of the load.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Although the discharge arrangement of this invention is described in detail for use with railway hopper cars transporting and depositing roadbed ballast, the discharge arrangement of the present invention can be fitted onto discharge openings of stationary containers for particulate material, or containers carried by other types of vehicles such as trucks.

Figure 1:
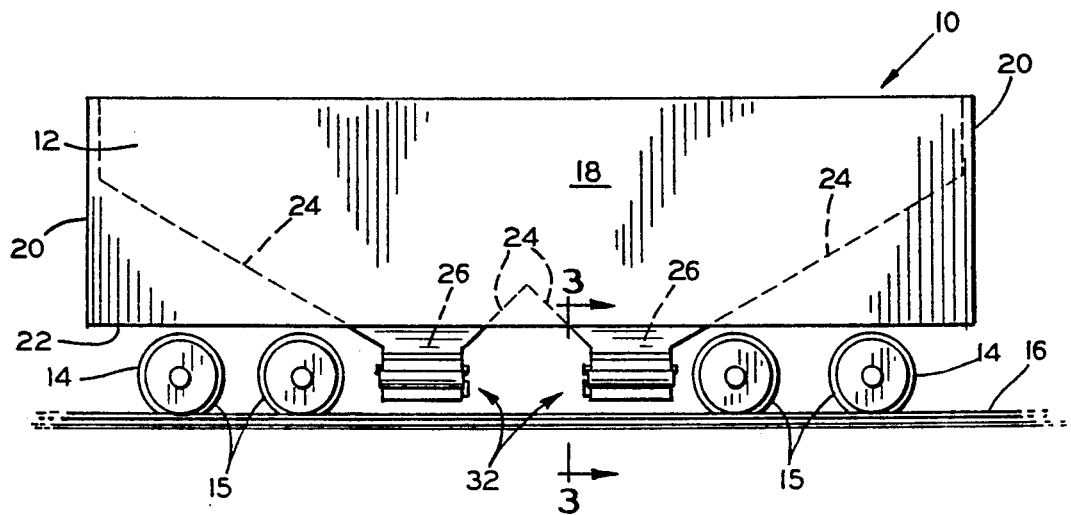
FIG. 1 is a side elevational view of a typical railroad hopper car to which discharge arrangements of the present invention have been installed.

FIG. 1 illustrates a conventional hopper car 10 having a body 12 which is carried on trucks 14. Wheels 15 of the trucks 14, in turn, are positioned on a pair of rails 16. The car body 12 is defined by spaced sidewalls 18 which join end walls 20. The bottom 22 of the car body 12 includes sets of sheets 24 which slope downwardly and terminate to form discharge openings 26, 26', as shown in FIGS. 1, 3, 4, and 5. It should be understood that each of the discharge openings 26 is aligned with one rail 16 while the substantially similar discharge openings 26' align with the other rail 16.

Installed below each discharge opening 26, 26' is the discharge arrangement, or ballast gate, of this invention, indicated generally at 32. Each of these discharge arrangements is substantially similar, therefore only one such discharge arrangement is described in detail.

Figure 2:
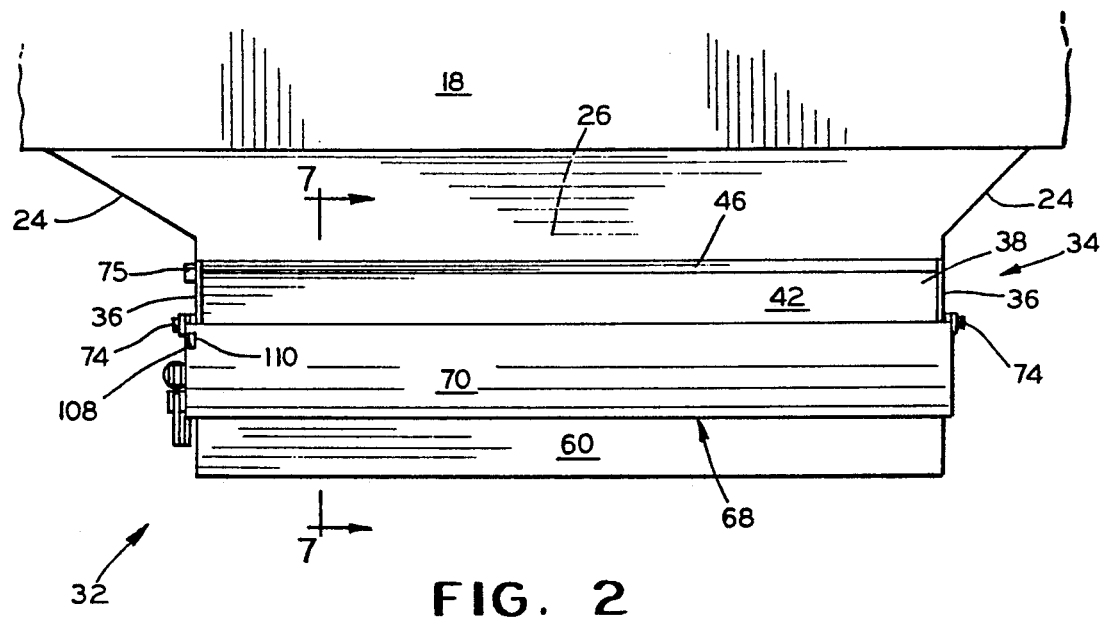
FIG. 2 is a enlarged side elevational view of one of the discharge arrangements of FIG. 1.
Figure 7:
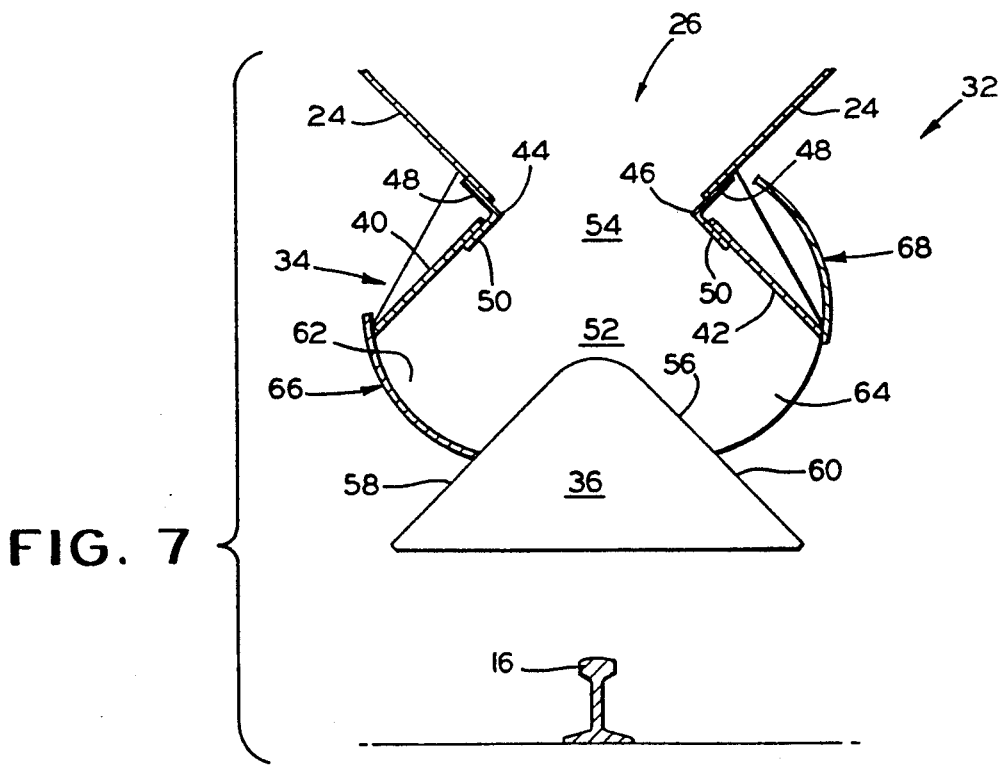
FIG. 7 is a sectional view of the discharge arrangement taken in the direction of the arrows along the section line 7—7 of FIG. 2.

Referring to FIGS. 2 and 7, the arrangement 32 includes a frame member, indicated generally at 34, comprising a pair of spaced vertical end walls 36 joined at their upper portions by a pair of spaced inner and outer side walls 40, 42. The inner and outer side walls 40, 42 are joined to the sheets 24 by respective inner and outer angular members 44, 46. The angular members 44, 46 are suitably offset so that an upper leg portion 48 of each angular member 44, 46 aligns with and may be readily fastened, by suitable means such as welding, to the car bottom sloped side sheets 24.

The angular members 44, 46 are suitably joined, by a method such as welding, along a lower leg portion 50 to the inner and outer side walls 40, 42. The frame member 34 defines an lower outlet portion 52, and an upper inlet portion 54, which receives ballast from the discharge opening 26.

Also attached to the end walls 36 is a shielding device 56, having an inner channel portion 58, and an outer channel portion 60 which slope upward to form an inverted V shape centered over the rail 16. The shielding device 56 traverses the outlet portion 52. Channel portions 58, 60 cooperate with respective inner and outer side walls 40, 42 to define, respectively, an inner outlet 62 and an outer outlet 64.

As illustrated in FIGS. 2, 3, 4, and 5, an inner and outer door 66, 68 are pivotally attached to the outer surface of the end walls 36. Each door 66, 68 has an arcuate door face plate 70 held between door end walls 72. Door end walls 72 are rotatably mounted on door pivot pins 74 affixed to the end walls 36. Door safety stops 75 adapted to limit the upward swing of the associated inner and outer doors 66, 68 are affixed to one end wall 36.

A door operator 76 is located on the same end of the discharge arrangement 32 as the door safety stops 75. The door operator 76 is pivotally attached to inner and outer doors 66, 68. It will be appreciated that although the door operator 76 comprises a hydraulic motor in the described preferred embodiment, the choice of the operating mechanism is largely dependant upon the energy sources available. In other applications, for example, an electric motor or a pneumatic motor may be used to advantage.

The door operator 76 is a double acting hydraulic motor of a type well known in the art, having an inner port 78, an outer port 80, a piston 82 slidingly received in a cylinder 84 (shown schematically in FIG. 6), and a piston rod 86 suitably attached at one end to the piston 82. The other end of the piston rod 86 extends out of the outer end of the cylinder 84 and is welded to a sleeve 88 pivotally mounted on a pin 90 in a support bracket 92 attached to the end wall 72 of the outer door 68. The inner end of the cylinder 84 is welded to a sleeve pivotally mounted on a pin 90 in a support bracket 92 attached to the end wall 72 of the inner door 66. The outer and inner doors 66, 68 are further connected to a door restraining mechanism, indicated generally at 93. The door restraining mechanism 93 includes a bracket 94 mounted on the end wall 36, and intermediate linkage arms 96 and 98. Opposite ends of the linkage arms 96 are pivotally connected respectively with a door pivot pin 100 and the end of the linkage arms 98. The door pivot pin 100 is received in a support bracket 102 attached to the end wall 72 of the respective outer and inner doors 66, 68. The linkage arms 98 are pivotally connected at the other end to pins 104 received in the bracket 94.

Figure 5:
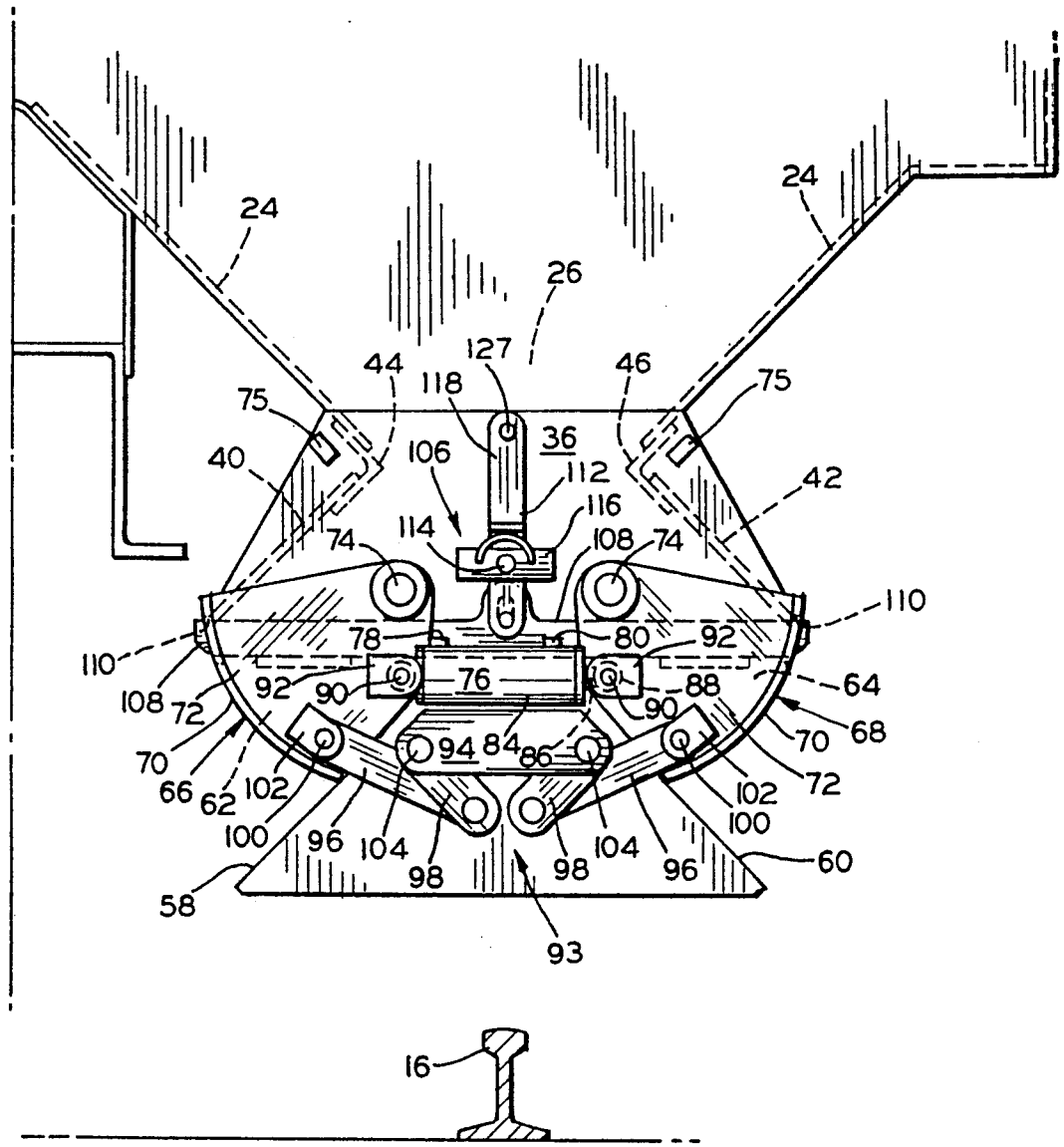
FIG. 5 is a view similar in part to FIG. 4 except both the inner and outer doors are shut and locked.

As best illustrated in FIG. 5, a door locking mechanism, indicated generally at 106, may be provided at the same end of the arrangement 32 as the door operator 76. The locking mechanism 106 includes a beam 108 slidably receivable in mating apertures 110 (FIG. 2) formed in the face plate 70 of the inner and outer doors 66, 68. An operating arm 112 is pivotally connected at an intermediate point along its length to a pivot pin 114 secured in a bracket 116. The operating arm 112 has an upper end 118 extending above the pivot pin 114. Locking means well known in the art may be provided to releasably fix the position of the operating arm 112.

The beam 108 pivotally depends from the lower end of the operating arm 112. The beam 108 is of sufficient length that it extends through the apertures 110 in the inner and outer doors 66, 68 when they are in the fully closed position. Thus engaged, the beam 108 cooperates with the operating arm 112 anchored by the pivot pin 114 to prevent either door from being opened.

Figure 3:
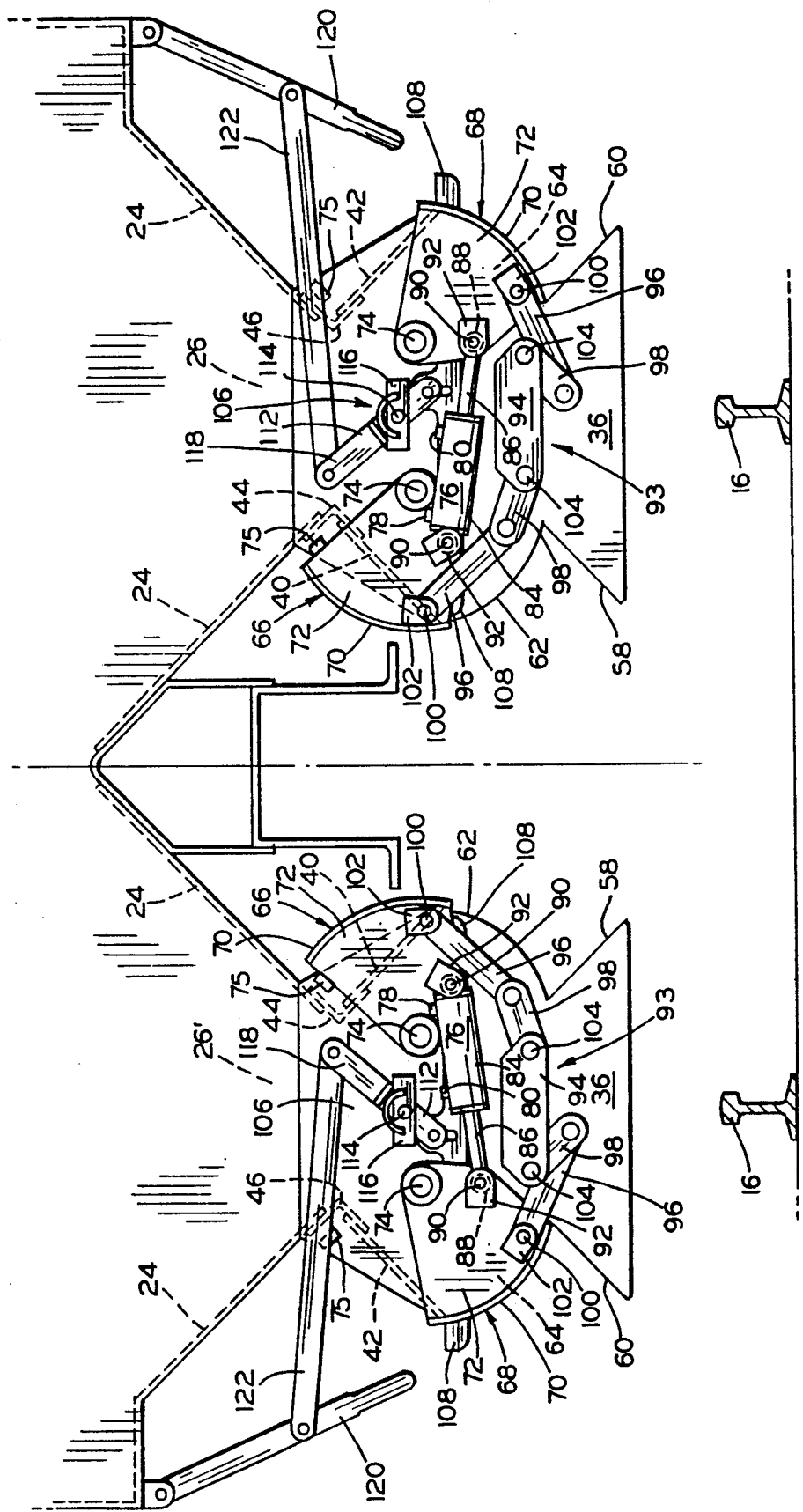
FIG. 3 is an end view of a pair of discharge arrangements as seen generally along the view line 3—3 of FIG. 1 wherein both inner doors are shown in an open position for depositing ballast between the rails, and both outer doors are shut and locked.

Various suitable mechanisms may be utilized to manipulate the operating arm 112. One such suitable mechanism is illustrated in FIG. 3, wherein the operating arm 112 is adapted to be remotely operated by a manually operated lever arm 120 and a pivotally interconnecting linkage arm 122.

Figure 4:
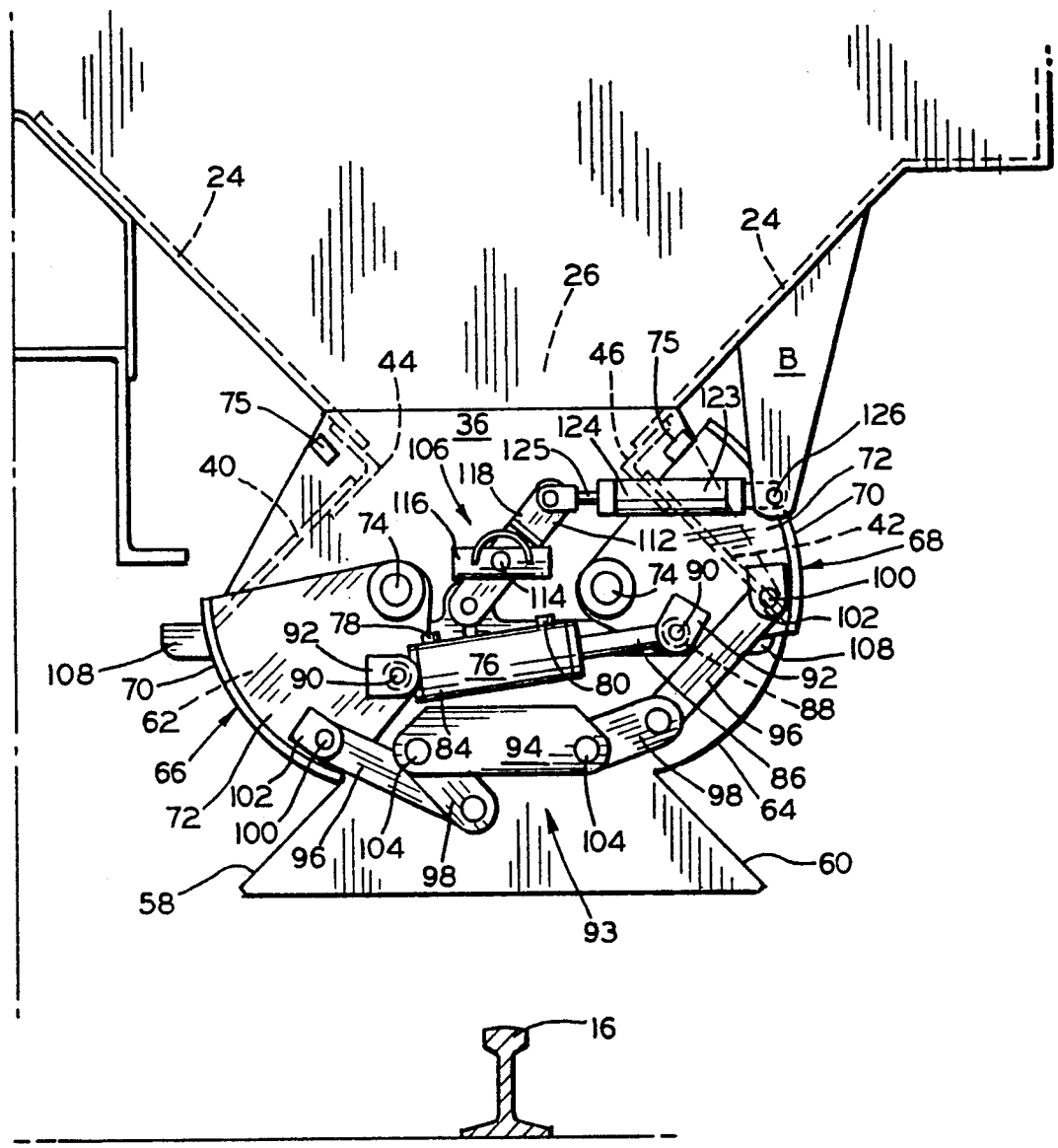
FIG. 4 is a partial view similar in part to FIG. 3 showing a single discharge arrangement wherein the outer door is open for depositing ballast outside the rails, and the inner door is shut and locked.

Alternatively, as shown in FIG. 4, the operating arm 112 may adapted to be remotely operated by a fluid motor lock operator 123 which may include a double acting hydraulic cylinder 124 and a piston rod 125. The piston rod 125 is pivotally connected to the operating arm 112. The cylinder 124 is pivotally connected to an anchor pin 126 suitably affixed to a bracket B depending from the sheets 24.

Referring to FIG. 5, the upper end 118 of the operating arm 112 may alternatively be adapted to be manually manipulated directly by the provision of a handle 127. The handle 127 may extend perpendicularly from the operating arm 112 and outwardly from the end wall 36.

Figure 6:
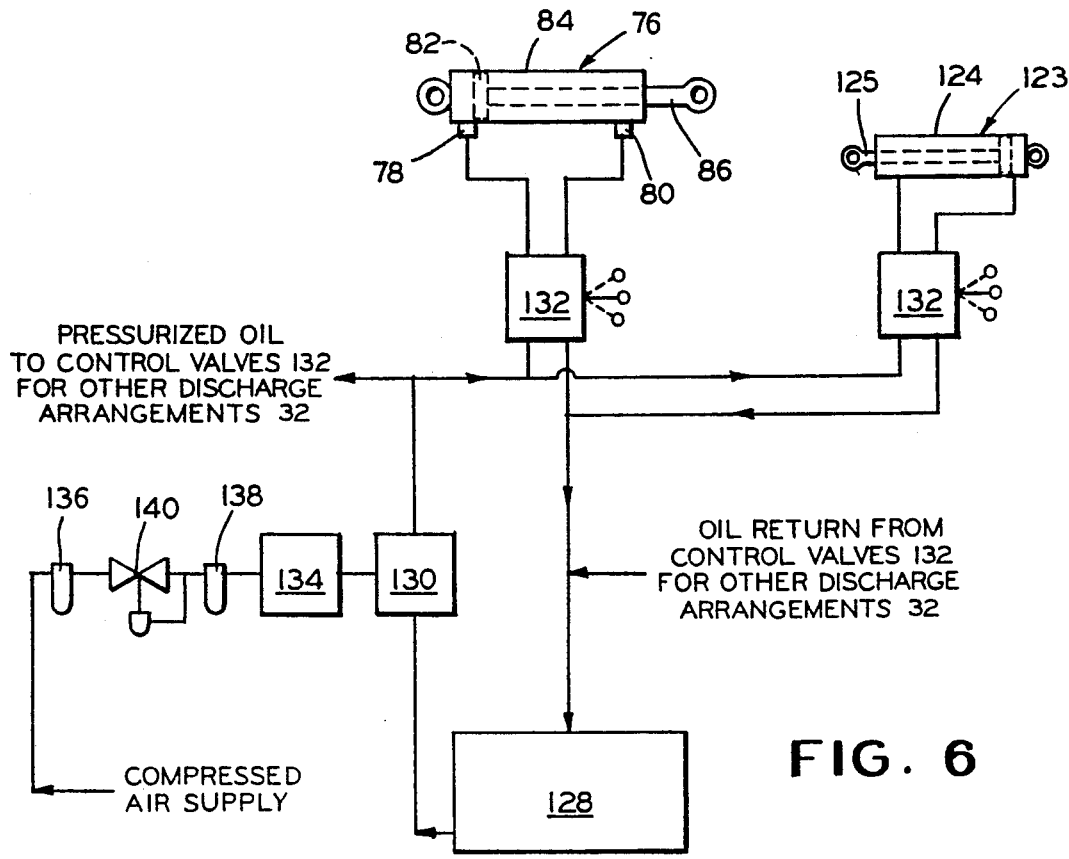
FIG. 6 is a schematic view of a typical manual control for the hydraulic operation of the discharge arrangement outlet doors.

As illustrated in FIG. 6, the hydraulic system provided to power the door operator 76 is of a type well known in the art. The hydraulic system comprises an oil reservoir 128, a hydraulic pump 130, a control valve 132 for each fluid motor to be operated, an air operated motor 134 to drive the hydraulic pump 130, and suitably interconnecting fluid conduit lines.

If a hydraulic lock operator 123 is installed, the hydraulic system may provide hydraulic control for the lock operator 123, as illustrated in FIG. 6. As further illustrated, one hydraulic system will typically supply and vent hydraulic oil for all the other discharge arrangements 32 (not shown) on the same hopper car 10.

The hydraulic pump 130 may be provided with an internal relief valve (not shown). Other types of motors may be used, but an air operated motor 134 is preferred to drive the hydraulic pump 130 because it is operated by compressed air, which is readily available in railroad applications. The air operated motor 134 may be provided with a filter 136, oil coalescer 138, and a pressure regulator 140 to condition the compressed air for use.

Referring now to FIG. 5, in operation the ballast car 10 is transported to the point where the ballast is to be discharged with the inner and outer doors 66, 68 locked closed by the beam 108, which extends through the apertures 110 in the inner and outer doors 66, 68, thereby preventing them from accidently opening. Upon arrival at the location where the ballast is to be discharged, a selected one of the inner door 66 or outer door 68 is unlocked to permit it to be opened.

Manual operation of the improved discharge arrangement of the present invention utilizing a remote operating lever arm 120 is illustrated in FIG. 3. In order to cause ballast to be discharged between the rails 16, on each discharge arrangement to be operated the upper end 118 of the operating arm 112 must be manipulated inwardly. The lever arm 120 is manipulated inwardly by operating personnel, causing the linkage arm 122 to urge the operating arm upper end 118 inwardly. This in turn causes the operating arm 112 to rotate about the pin 114, and to urge the beam 108 to move outwardly through the aperture 110 in the outer door 68. The beam 108 thereby disengages from the aperture 110 in the inner door 66, unlocking the inner door 66.

Referring to FIGS. 4 and 6, the use of the lock operator 123 is illustrated in conjunction with discharging ballast outside the rails 16. It will be appreciated that to discharge ballast between the rails 16, the inner door 66 must be unlocked by manipulating the operating arm 112, in a manner similar to the manipulation of the operating arm 112 to unlock the outer door 68 so that ballast could be discharged outside the rails 16.

In the embodiment shown in FIGS. 4 and 6, operating personnel at a remote operating station (not shown) start the hydraulic system in a manner to be later described. The control valve 132 provided for the lock operator 123 is placed in the "retract" position, causing the piston rod 125 to retract into the cylinder 124. The lock operator 123 thereby causes the operating arm 112 to rotate about the pin 114. The beam 108 is thereby urged to disengage from the aperture 110 in the outer door 68, and the control valve 132 is returned to the "neutral" position. It can be seen that in order to subsequently manipulate the operating arm 112 in the other direction in order to lock the outer door 68 or unlock the inner door 66, the control valve 132 would be placed in the "extend" position until the beam 108 was in the desired position.

It will be appreciated that no remote operator is required for manipulation of the operating arm 112. As shown in FIG. 5, the arm 112 may be provided with a handle 127 by which the operating personnel may directly manipulate the upper end 118 of the operating arm 112 in order to position the beam 108 to the desired position.

In the preferred embodiment, two pairs of discharge openings 26, 26' will be formed in the car 10 and provided with an associated discharge arrangement 32. If it should be desired to discharge ballast inside and outside the rails 16 simultaneously, one pair of discharge arrangements 32 may be aligned to discharge ballast outside the rails 16, while the other pair of discharge arrangements 32 may be aligned to discharge ballast inside the rails 16.

Referring now to FIG. 6, in order to start the hydraulic system, air from the compressed air supply (not shown) is admitted to the air driven motor 134. The air may be suitably conditioned by directing it through the filter 136, the oil coalescer 138, and the pressure regulator 140. The air driven motor 134 operates the hydraulic pump 130, which draws hydraulic fluid from the oil reservoir 128 and supplies it under pressure to the control valves 132.

Referring to FIGS. 3, 4, and 6, with an inner or outer door 66 or 68 unlocked, the control valve 132 for the door operator 76 is placed in the "open" position. Hydraulic fluid from the oil reservoir 128 is thereby directed under pressure to the inner port 78 of the cylinder 84. Simultaneously, fluid is vented from the outer port 80 back through the control valve 132 and then to the oil reservoir 128.

The piston 82 is thereby urged toward the outer port 80, causing the piston rod 86 to extend outwardly from the cylinder 84. The door operator 76 thus exerts a force upon the inner and outer doors 66, 68 which tends to cause the inner and outer doors 66, 68 to move relatively away from each other. The locked door 66 or 68 will not move, being prevented from moving by the beam 108. The unlocked door 66 or 68 will be urged to pivot open in response to the force exerted by the door operator 76.

As the unlocked door 66 or 68 opens, ballast is discharged under the influence of gravity from the hopper discharge opening 26, into the discharge arrangement and out of the inner or outer outlet 62 or 64 associated with the unlocked inner or outer door 66 or 68, respectively. The presence of the shielding device 56, forming a part of the inner and outer outlets 62, 64, prevents ballast from being deposited directly on the rail 16.

When the desired rate of ballast discharge is achieved, or the unlocked inner or outer door 66 or 68 reaches the door safety stop 75, the control valve 132 is returned to the neutral position, sealing off the fluid conduit lines to and from the door operator 76, and directing the flow of fluid from the hydraulic pump 130 back to the oil reservoir 128. Due to the presence of hydraulic fluid on either side of the piston 82, with no vent path for that fluid, the door operator 76 will stop in its extended position.

As the door 66 or 68 opens, the intermediate linkage arms 96 and 98 unfold. If the door safety stop 75 should fail, and the door 66 or 68 travel past its normal full open position at door safety stop 75, the linkage arms 96 and 98 will be fully extended and further opening will be prevented by the door restraining mechanism 93.

In order to close the open door 66 or 68, the control valve 132 is placed in the "close" position. Pressurized fluid from the hydraulic pump is thereby directed under pressure to the outer port 80 of the cylinder 84. Simultaneously, fluid is vented from the inner port 78 back through the control valve 132 and then to the oil reservoir 128. The piston 82 is thereby urged toward the inner port 78, causing the piston rod 86 to retract into the cylinder 84

The door operator 76 thereby exerts a force upon the inner and outer doors 66, 68, which tends to cause the inner and outer doors 66, 68 to move relatively toward one another. The locked door 66 or 68 will not move, being prevented from moving by the beam 108. The unlocked door 66 or 68 will be urged to pivot closed in response to the force exerted by the door operator 76.

When the unlocked door 66 or 68 reaches its closed position, the control valve 132 is returned to the "neutral" position, the locking mechanism 106 may be operated to lock both the inner and the outer doors 66, 68, and the hydraulic system may be shut down.

Note that while the ballast produces a considerable gravitational load on the discharge arrangement 26, this load is only partially transmitted to the inner and outer doors 66, 68 since the face plate 70 of each door 66, 68 is positioned at an angle to the line of force of the load. Thus the frictional force of the ballast restraining door movement is reduced, reducing the load capacity requirements of the operating mechanism and associated hydraulic system.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A discharge arrangement for discharging a load from a hopper structure, said hopper structure including at least one discharge opening, said discharge arrangement including, in combination, a) a frame member having end walls and side walls forming an inlet and an outlet portion of said discharge arrangement, said inlet portion of said discharge arrangement proximate said discharge opening of said hopper structure;

b) a shielding device blocking a portion of said outlet portion of said discharge arrangement to provide a pair of outlets in said outlet portion of said discharge arrangement;

c) a pair of doors pivotally mounted to said end walls of said frame member to selectively open and close said pair of outlets;

d) locking means to selectively lock both or either of said pairs of doors closed, wherein said locking means comprises a beam slidably received in mating apertures in said pairs of doors, whereby said doors may be prevented from opening;

e) a door restraining mechanism connected to both of said doors to limit the travel thereof; and f) operating means separate from said door restraining mechanism connected between said pair of doors adapted to open whichever of said pair of doors that is not locked.

2. A ballast door mechanism for discharging a ballast from a hopper structure, said hopper structure including at least one discharge opening, said ballast door mechanism including, in combination, a) a frame member having end walls and side walls forming an inlet and an outlet portion of said ballast door mechanism, said inlet portion of said ballast door mechanism proximate said discharge opening of said hopper structure;

b) a shielding device blocking a portion of said outlet portion of said ballast door mechanism to provide a pair of outlets in said outlet portion of said ballast door mechanism;

c) a pair of ballast doors pivotally mounted to said end walls of said frame member to selectively open and close said pair of outlets;

d) locking means to selectively lock both or either of said pair of ballast doors closed, wherein said locking means comprises a beam slidably received in mating apertures in said pair of ballast doors, whereby said ballast doors may be prevented from opening;

e) a linkage means connected to both of said ballast doors to limit the travel thereof; and f) operating means connected between said pair of ballast doors adapted to open whichever of said pair of ballast doors that is not locked.

3. A discharge arrangement for discharging a load of ballast from a railroad hopper car, said hopper car riding on a pair of rails, said hopper car including at least one pair of discharge openings, each said discharge opening being provided with one said discharge arrangement and aligned with a respective one of said rails, each said discharge arrangement including, in combination, a) a frame member having end walls and side walls forming an inlet and an outlet portion of said discharge arrangement, said inlet portion of said discharge arrangement proximate said discharge opening of said hopper car;

b) a shielding device blocking a portion of said outlet portion of said discharge arrangement to provide a pair of outlets in said outlet portion of said discharge arrangement, said shielding device being aligned with a respective one of said rails;

c) a pair of doors pivotally mounted to said end walls of said frame member to selectively open and close said pair of outlets;

d) a beam slidably received in mating apertures formed in said pair of doors, said beam adapted to selectively lock both or either of said pair of doors closed;

e) an operating arm pivotally engaging said beam, whereby said beam may be positioned to disengage the aperture in a selected one of said pair of doors;

f) a linkage means connected to both of said doors to limit the travel thereof; and g) a fluid motor including a cylinder, a piston slidably received in said cylinder, a piston rod affixed to said piston and extending from said cylinder, said cylinder pivotally connected to a selected one of said pair of doors, said piston rod pivotally connected to the other one of said pair of doors, whereby said fluid motor is adapted to open whichever of said pair of doors that is not locked.

4. A automated ballast door mechanism for discharging a load of ballast from a railroad hopper car, said hopper car riding on a pair of rails, said hopper car including at least one pair of discharge openings, each said discharge opening being provided with one said ballast door mechanism and aligned with a respective one of said rails, each said ballast door mechanism including, in combination, p1 a) a frame member having end walls and side walls forming an inlet and an outlet portion of said ballast door mechanism, said inlet portion of said ballast door mechanism proximate said discharge opening of said hopper car;

b) a shielding device blocking a portion of said outlet portion of said ballast door mechanism to provide a pair of outlets in said outlet portion of said ballast door mechanism, said shielding device being aligned with a respective one of said rails;

c) a pair of ballast doors pivotally mounted to said end walls of said frame member to selectively open and close said pair of outlets;

d) a beam slidably received in mating apertures formed in said pair of ballast doors, said beam adapted to selectively lock both or either of said pair of ballast doors closed;

e) an operating arm pivotally engaging said beam, whereby said beam may be positioned to disengage the aperture in a selected one of said pair of ballast doors;

f) a linkage means connected to both of said ballast doors to limit the travel thereof; and g) a fluid motor including a cylinder, a piston slidably received in said cylinder, a piston rod affixed to said piston and extending from said cylinder, said cylinder pivotally connected to a selected one of said pair of ballast doors, said piston rod pivotally connected to the other one of said pair of ballast doors, whereby said fluid motor is adapted to open whichever of said pair of ballast doors that is not locked.

5. A discharge arrangement for discharging a load from a hopper structure, said hopper structure including at least one discharge opening, said discharge arrangement including, in combination, a) a frame member having end walls and side walls forming an inlet and an outlet portion of said discharge arrangement, said inlet portion of said discharge arrangement proximate said discharge opening of said hopper arrangement;

b) a shielding device blocking a portion of said outlet portion of said discharge arrangement to provide a pair of outlets in said outlet portion of said discharge arrangement;

c) a pair of doors pivotally mounted to said end walls of said frame member to selectively open and close said pair of outlets;

d) a beam slidably received in mating apertures in said pair of doors to selectively lock both or either of said pair of doors closed, whereby said doors may be prevented from opening;

e) a linkage means connected to both of said doors to limit the travel thereof; and f) operating means connected between said pair of doors adapted to open whichever of said pair of doors that is not locked.

6. The invention defined in claim 5, wherein said hopper structure is provided in a vehicle.

7. The invention defined in claim 6, wherein said vehicle is a railroad car.

8. The invention defined in claim 7, wherein each said discharge opening is aligned with a rail upon which said railroad car is riding.

9. The invention defined in claim 7, wherein said load comprises ballast for use in a railroad roadbed.

10. The invention defined in claim 5, wherein said operating means includes a fluid motor.

11. The invention defined in claim 10, wherein said fluid motor comprises a hydraulic cylinder and piston.

12. The invention defined in claim 5, wherein said beam is positioned by means of an operating arm pivotally connected to said beam.

13. The invention defined in claim 12, wherein said operating arm is positioned by a fluid motor.

14. The invention defined in claim 12, wherein said operating arm is positioned manually.

15. A ballast door mechanism for discharging a ballast from a hopper structure, said hopper structure including at least one discharge opening, said ballast door mechanism including, in combination, a) a frame member having end walls and side walls forming an inlet and an outlet portion of said ballast door mechanism, said inlet portion of said ballast door mechanism proximate said discharge opening of said hopper structure;

b) a shielding device blocking a portion of said outlet portion of said ballast door mechanism to provide a pair of outlets in said outlet portion of said ballast door mechanism;

c) a pair of ballast doors pivotally mounted to said end walls of said frame member to selectively open and close said pair of outlets;

d) a beam slidably received in mating apertures in said pair of ballast doors to selectively lock both or either of said pair of ballast doors closed;

e) a linkage means connected to both of said ballast doors to limit the travel thereof; and f) operating means connected between said pair of ballast doors adapted to open whichever of said pair of ballast doors that is not locked.

16. The invention defined in claim 15, wherein said beam is positioned by means of an operating arm pivotally connected to said beam.

17. The invention defined in claim 16, wherein said operating arm is positioned by a fluid motor.

18. The invention defined in claim 16, wherein said operating arm is positioned manually.

19. The invention defined in claim 15, wherein said operating means includes a fluid motor.

20. The invention defined in claim 19, wherein said fluid motor comprises a hydraulic cylinder and piston.

21. The invention defined in claim 15, wherein said hopper structure is provided in a railroad hopper car.

22. The invention defined in claim 21, wherein each said discharge opening is aligned with a rail upon which said railroad hopper car is riding.

* * * * *